UNITED STATES PATENT OFFICE.

FRED E. BURLINGAME, OF CENTRAL FALLS, RHODE ISLAND, ASSIGNOR OF ONE-HALF TO FREDERICK E. SHAW, OF PROVIDENCE, RHODE ISLAND.

TANNING LIQUOR.

SPECIFICATION forming part of Letters Patent No. 563,560, dated July 7, 1896.

Application filed April 20, 1896. Serial No. 588,373. (No specimens.)

*To all whom it may concern:*

Be it known that I, FRED ELISHA BURLINGAME, of Central Falls, in the county of Providence and State of Rhode Island, have invented a new and useful Improvement in Tanning Liquor; and I hereby declare that the following is a full, clear, and exact description of the same.

After a series of practical experiments I have ascertained that the condensed products of destructive distillation of woody fiber contain valuable tanning properties and are useful for tanning hides. I have prepared tanning liquor by mixing with the crude product of the distillation of wood, as it comes from the still, common salt, (chlorid of sodium.) I have usually dissolved the salt in water and then added the water to the crude product of distillation in equal quantities, that is to say, a gallon of the salt water to a gallon of the wood distillate. These I agitate until they are thoroughly mixed, when the liquor assumes a darker murky appearance. I have used this liquor for tanning hides by immersing the hides in the liquor, and find that the hides are more quickly impregnated with the liquid and are converted into leather in less time than when the ordinary tan liquor is used. I have also prepared the tanning liquor by mixing the crude pyroligneous acid of commerce with water in which common salt has been dissolved in varying proportions, and while I find that a liquor composed of fifty per cent. of crude pyroligneous acid and fifty per cent. of water in which ten per cent. of common salt has been dissolved answers well for the tanning of hides, I also find that the crude product of distillation of the wood containing the pyroligneous acid, creosote, resinous matter, and oily products, when about ten per cent. of chlorid of sodium (common salt) is dissolved in the same, will produce a more active tanning liquor.

I find that alkalies, the alkaline earths, the salts of the alkalies, and the salts of the alkaline earths produce, when mixed with the crude product of destructive distillation of wood fiber or with the crude pyroligneous acid, a tanning liquor having practically the same qualities as when mixed with salt. For convenient and economical reasons I prefer the use of common salt, (chlorid of sodium,) but I do not wish to confine myself to the use of common salt in the preparation of the tanning liquor or to the proportions hereinbefore described, as I find that these may be greatly varied.

The crude product of the destructive distillation of wood fiber mixed with salt or an alkaline substance, as also the crude pyroligneous acid mixed with chlorid of sodium or any other of the herein-described equivalent agents, can be combined with tan-bark, sumac, and other similar tanning liquors, and the time required to tan a hide greatly reduced.

Having thus described my invention, I claim as new and desire to secure by Letters Patent—

1. A tanning liquor, containing the condensed product of destructive distillation of wood fiber and chlorid of sodium or its equivalent, substantially as described.

2. A tanning liquor consisting of pyroligneous acid, water and chlorid of sodium or its equivalent in the proportions substantially as herein described.

In witness whereof I have hereunto set my hand.

FRED E. BURLINGAME.

Witnesses:
   JOSEPH A. MILLER,
   JOSEPH A. MILLER, Jr.